United States Patent
Mizuno et al.

(10) Patent No.: US 10,366,831 B2
(45) Date of Patent: Jul. 30, 2019

(54) MULTILAYER CAPACITOR

(71) Applicant: TAIYO YUDEN CO., LTD., Taito-ku, Tokyo (JP)

(72) Inventors: Kotaro Mizuno, Takasaki (JP); Yoichi Kato, Takasaki (JP); Yukihiro Konishi, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/004,845

(22) Filed: Jan. 22, 2016

(65) Prior Publication Data

US 2016/0225525 A1    Aug. 4, 2016

(30) Foreign Application Priority Data

Jan. 30, 2015  (JP) .................................. 2015-017007

(51) Int. Cl.

| | |
|---|---|
| *H01G 4/012* | (2006.01) |
| *H01G 4/12* | (2006.01) |
| *H01G 4/30* | (2006.01) |
| *H01G 4/005* | (2006.01) |
| *H01G 4/008* | (2006.01) |

(52) U.S. Cl.
CPC .......... *H01G 4/008* (2013.01); *H01G 4/1227* (2013.01); *H01G 4/30* (2013.01)

(58) Field of Classification Search
CPC .......... H01G 4/30; H01G 4/232; H01G 4/005; H01G 4/008; H01G 4/12; H01G 4/012
USPC ................ 361/303, 321.1, 301.4, 321.2, 304
See application file for complete search history.

(56) References Cited

U.S. PATENT DOCUMENTS

| | | | | |
|---|---|---|---|---|
| 2006/0138590 A1* | 6/2006 | Suzuki | ................. | H01G 4/0085 257/532 |
| 2008/0210564 A1* | 9/2008 | Motoki | .................. | H01G 4/012 205/122 |
| 2010/0021735 A1* | 1/2010 | Akimoto | .................... | B22F 1/02 428/403 |
| 2012/0147516 A1* | 6/2012 | Kim | ....................... | H01G 4/232 361/301.4 |

(Continued)

FOREIGN PATENT DOCUMENTS

| | | | |
|---|---|---|---|
| JP | 10214520 A | * | 8/1998 |
| JP | 2001035738 A | | 2/2001 |

*Primary Examiner* — Eric W Thomas
*Assistant Examiner* — Arun Ramaswamy
(74) *Attorney, Agent, or Firm* — Law Office of Katsuhiro Arai

(57) ABSTRACT

A multilayer capacitor has dielectric layers and multiple internal electrode layers. The laminate includes a stack of multiple dielectric layers made of dielectric material and has a first principal face and a second principal face on the opposite side of the first principal face. In an embodiment, the multiple internal electrode layers have Ni as a primary component, contain at least one metal element selected from Pt, Ru, Rh, Re, Ir, Os, and Pd, and are arranged in parallel with the first principal face and second principal face inside the laminate in such a way that they alternate from the opposing sides with the dielectric layers placed in between, wherein each of the internal electrode layer closest to the first principal face and the internal electrode layer closest to the second principal face has a distance of 30 μm or less from the corresponding principal face.

2 Claims, 6 Drawing Sheets

(56) References Cited

U.S. PATENT DOCUMENTS

2013/0342956 A1* 12/2013 Konishi ............... H01G 4/005
361/301.4

* cited by examiner

[Fig. 1]
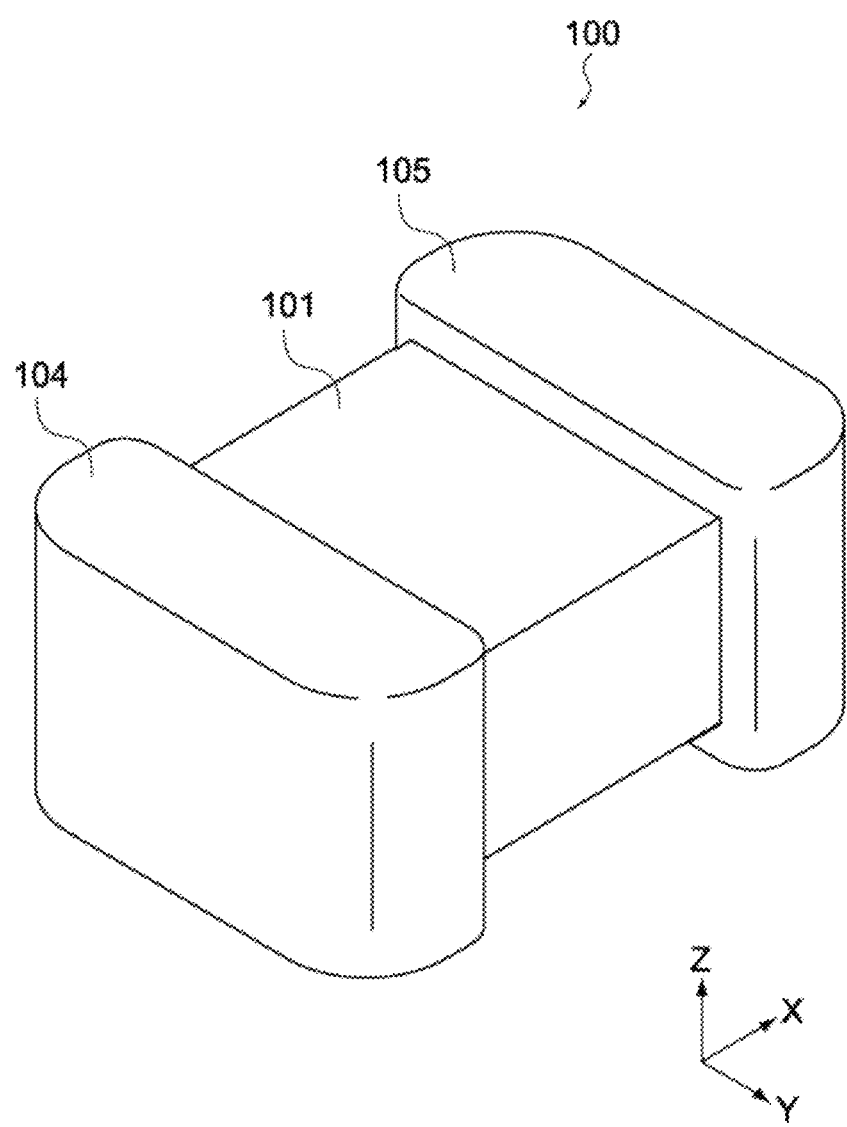

[Fig. 2]
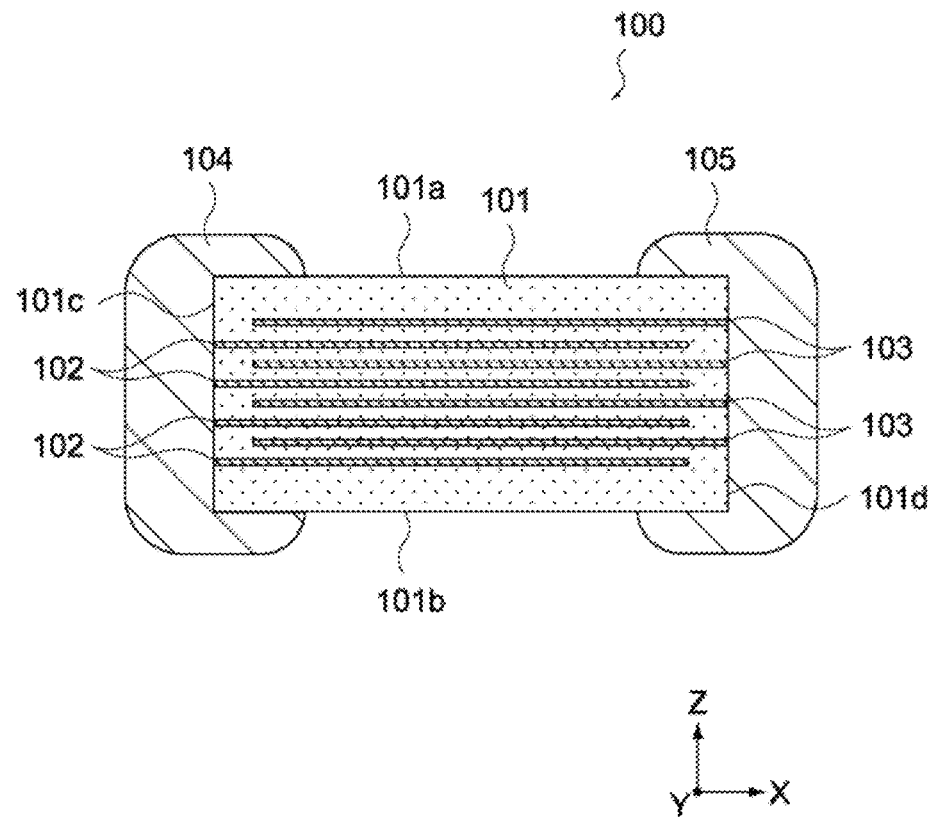
[Fig. 3]
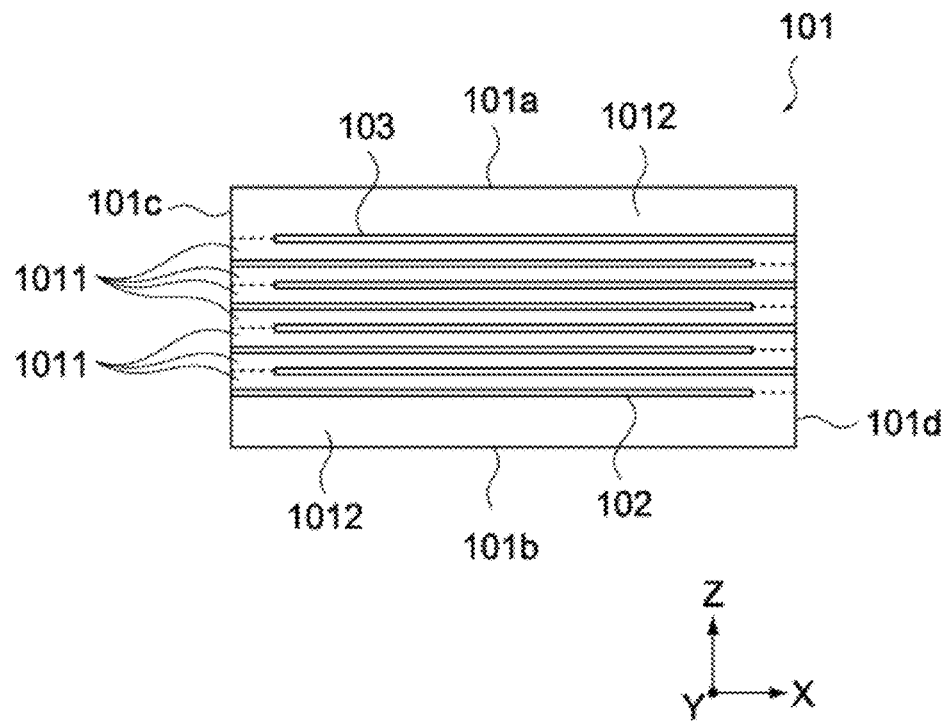

[Fig. 4]
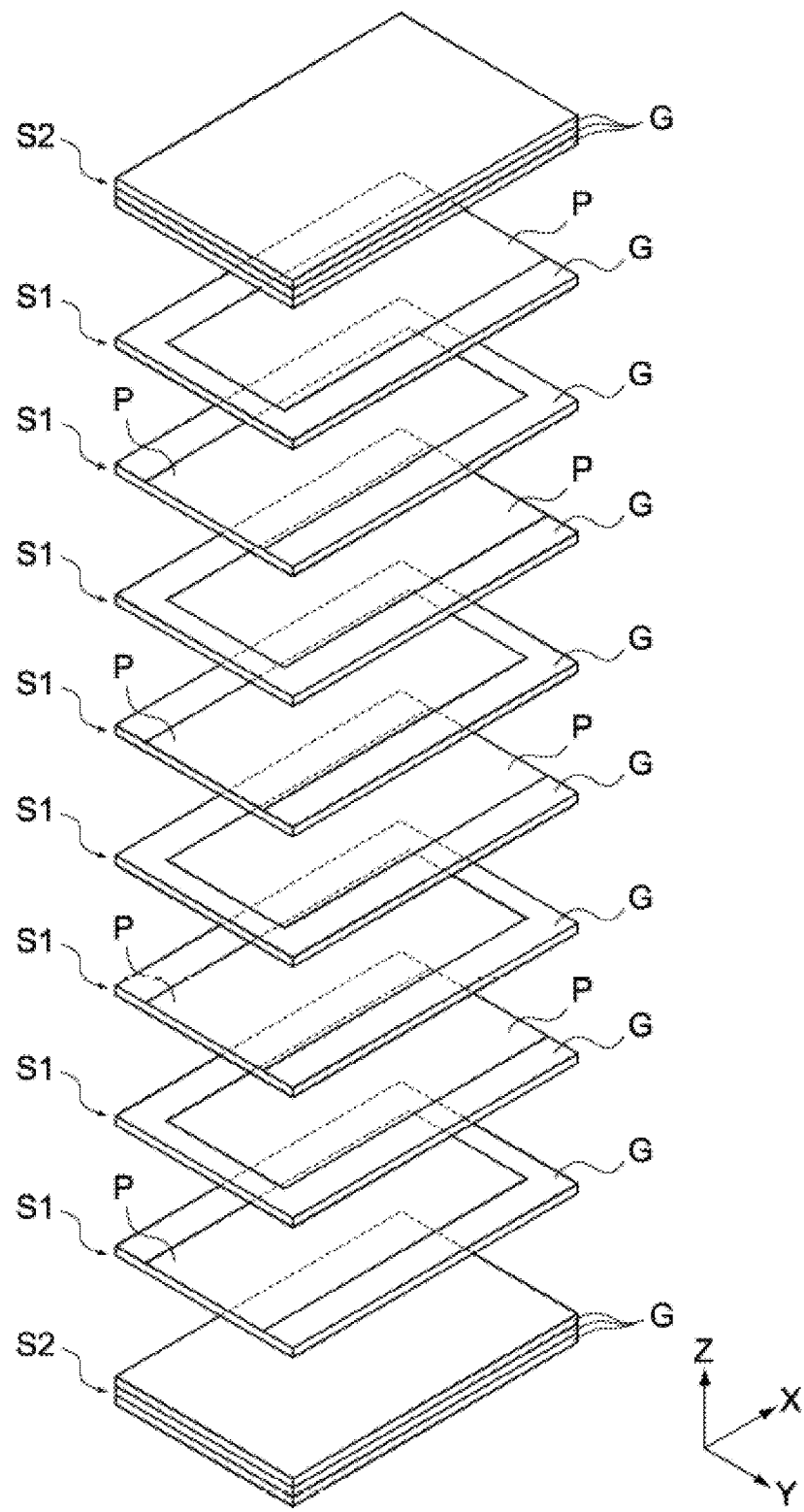

[Fig. 5]
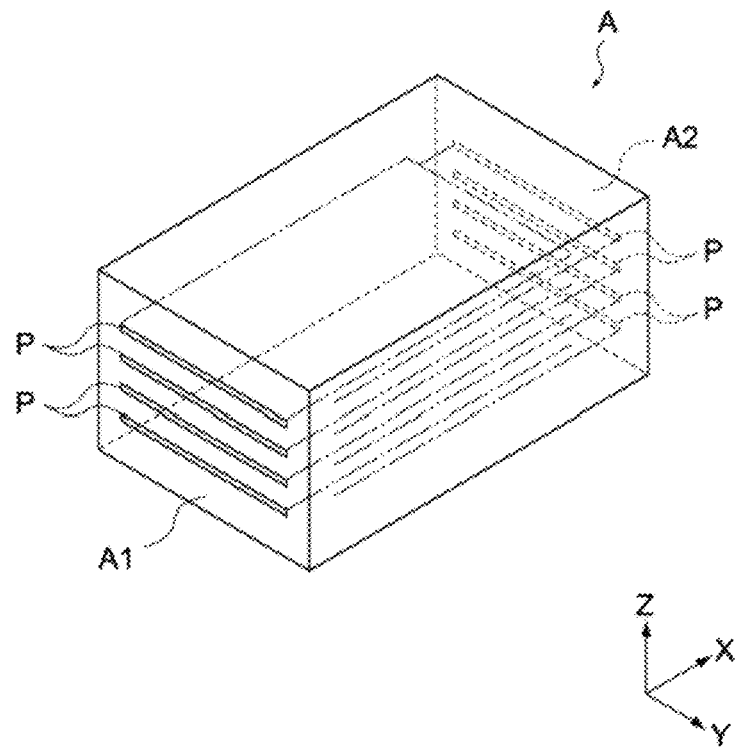
[Fig. 6]
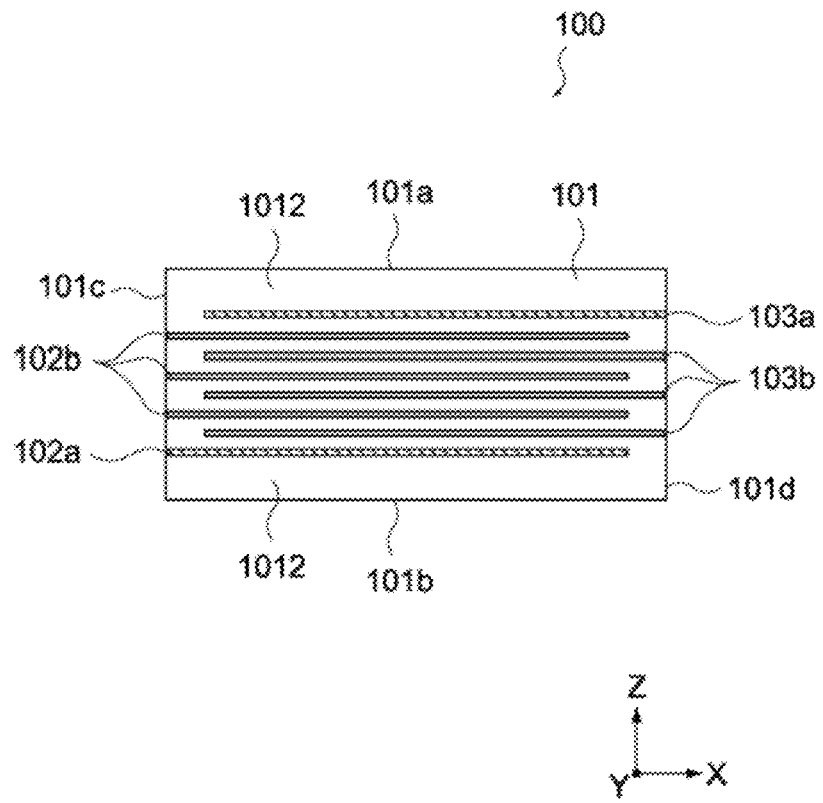

[Fig. 7]
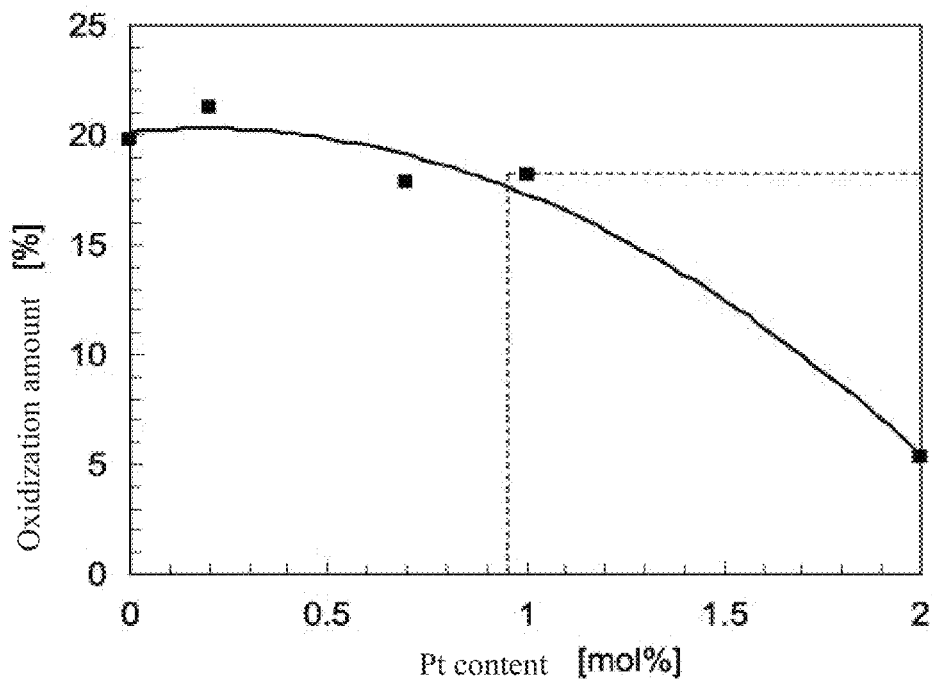
[Fig. 8]
| Material for internal electrode layer | Thickness of cover [μm] | Thickness of internal electrode layer [μm] | Number of failed samples | Oxidization |
|---|---|---|---|---|
| Ni | 50 | 0.5 | 0 | × |
| | 30 | 0.5 | 1 | × |
| | 15 | 0.5 | 2 | × |
| Ni-Pt1.0mol% | 50 | 0.5 | 0 | ○ |
| | 30 | 0.5 | 0 | ○ |
| | 15 | 0.5 | 0 | ○ |
| Ni-Pt3.5mol% | 15 | 0.5 | 0 | ○ |
| | 15 | 0.1 | 0 | ○ |
| | 15 | 0.05 | 0 | ○ |
| Ni-Pt5mol% | 15 | 0.1 | 0 | ○ |
| Ni-Pd1.0mol% | 15 | 0.1 | 0 | ○ |
| Ni-Rh1.0mol% | 15 | 0.1 | 0 | ○ |
| Ni-Pt+Pd1.0mol% | 15 | 0.1 | 0 | ○ |

[Fig. 9]
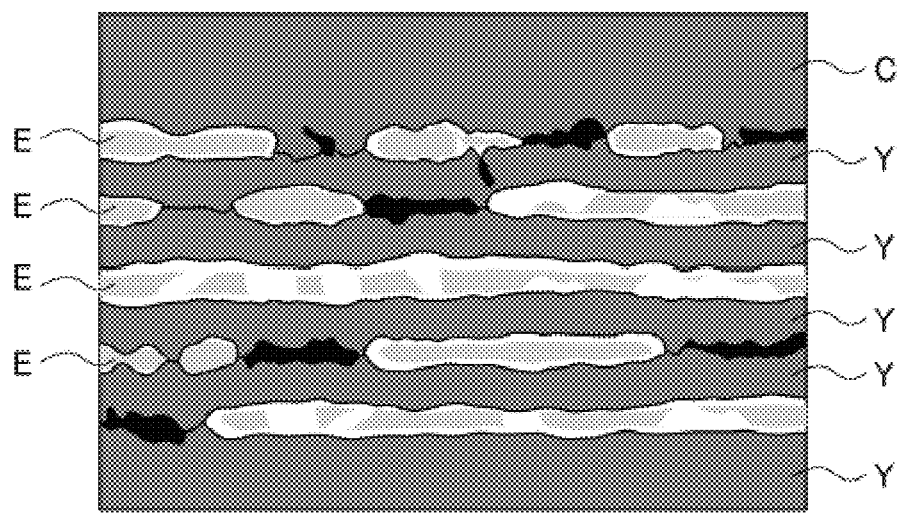
[Fig. 10]
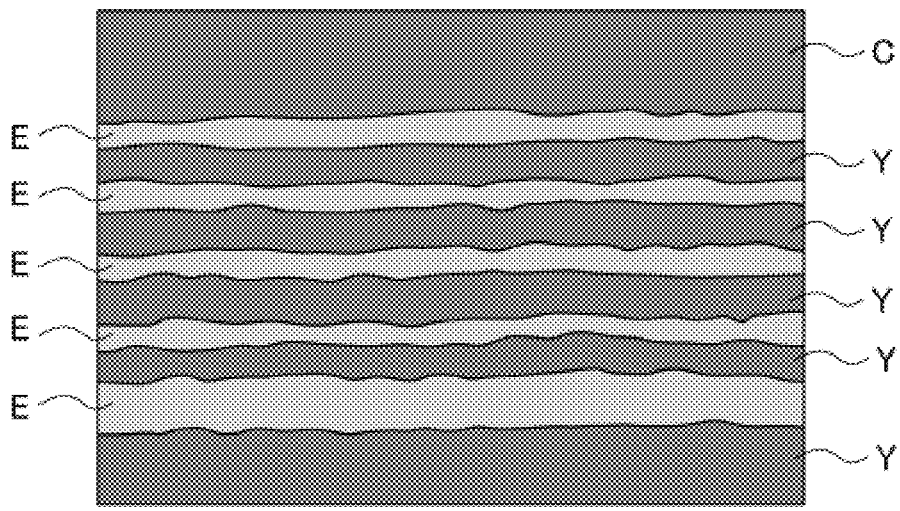

MULTILAYER CAPACITOR

BACKGROUND

Field of the Invention

The present invention relates to a multilayer capacitor comprising dielectrics and electrodes stacked alternately together.

Description of the Related Art

A multilayer capacitor is constituted by dielectric layers made of dielectric material, and internal electrode layers made of conductive material, which are stacked alternately together. The internal electrode layers are divided into positive electrodes connected to a positive terminal and negative electrodes connected to a negative terminal, and arranged in such a way that the positive electrodes and negative electrodes alternate.

For example, a multilayer ceramic capacitor (MLCC) is produced through a number of steps that include applying a paste containing Ni or other metal material onto dielectric green sheets whose primary material is barium titanate or other dielectric material and then stacking the sheets into a laminate, compression-bonding and cutting the laminate, providing external electrodes, removing binder, and sintering, etc.

To make the MLCC smaller yet offering larger capacitance, it is necessary to make the dielectric layers and internal electrode layers thinner and stack them higher. Here, one effective way to achieve higher stacking is to reduce the thickness of the covers which are positioned at the top layer and bottom layer of the internal electrode crossing part where the internal electrode layers and dielectric layers are arranged alternately and which shield the internal electrode crossing part from the outside.

However, thinner covers mean higher chances of cracking and delamination. Additionally, insufficient moisture resistance or oxidization resistance leads to oxidization of the internal electrode layers and deterioration of the element characteristics. To avoid these consequences, methods have been proposed that involve setting the thickness of the internal electrode crossing part and that of the covers within certain ranges.

BACKGROUND ART LITERATURES

[Patent Literature 1] Japanese Patent Laid-open No. 2001-35738

SUMMARY

However, the thickness of the covers must be reduced further in order to achieve size reduction and capacitance increase. Moreover, reducing the thickness of the internal electrode layer to 0.5 μm or less makes the internal electrode layers more prone to oxidization due to an increase in the surface ratio of the internal electrode layer.

In light of the aforementioned circumstances, an object of the present invention is to provide a multilayer capacitor that can be made smaller while achieving larger capacitance by means of thinner covers, without causing a drop in capacitance or reliability.

To achieve the aforementioned object, a multilayer capacitor pertaining to an embodiment of the present invention has a laminate and multiple internal electrode layers.

The laminate comprises a stack of multiple dielectric layers made of dielectric material, and has a first principal face and a second principal face on the opposite side of the first principal face.

The multiple internal electrode layers have Ni as a primary component and are arranged in parallel with the first principal face and second principal face inside the laminate in such a way that they alternate from the opposing sides with the dielectric layers placed in between.

Of the internal electrode layers, at least the internal electrode layer closest to the first principal face and internal electrode layer closest to the second principal face contain at least one type of metal selected from Pt, Ru, Rh, Re, Ir, Os, and Pd.

Of the multiple internal electrode layers, the internal electrode layer closest to the first principal face has a distance of 30 μm or less from the first principal face.

Of the multiple internal electrode layers, the internal electrode layer closest to the second principal face has a distance of 30 μm or less from the second principal face.

According to this constitution, the thickness of the parts covering the internal electrode layers (=covers), or specifically the distance between the internal electrode layers closest to the respective principal faces and the respective principal faces, is 30 μm or less and therefore oxygen permeates through the covers and diffuses into the laminate in the sintering process included in the manufacturing process of the multilayer capacitor. If the internal electrode layers are oxidized by this oxygen, the capacitance and reliability of the multilayer capacitor may drop. However, the internal electrode layers contain at least one type of metal (hereinafter referred to as "precious metal element") selected from Pt, Ru, Rh, Re, Ir, Os, and Pd, and this prevents oxidization of the internal electrode layers by the oxygen that has diffused into the laminate. In other words, according to the aforementioned constitution, the multilayer capacitor can be made thinner by means of thinner covers, while preventing a drop in capacitance or reliability due to oxidization of the internal electrode layers.

As for the internal electrode layers, preferably three or more layers contain at least one type of metal selected from Pt, Ru, Rh, Re, Ir, Os, and Pd.

According to this constitution, oxidization of the internal electrode layers can be prevented with high certainty.

Preferably the first internal electrode layers and second internal electrode layers contain at least one type of metal selected from Pt, Ru, Rh, Re, Ir, Os, and Pd, by at least 1 percent by mol relative to Ni.

According to this constitution, oxidization of the first internal electrode layers and second internal electrode layers can be prevented effectively by the precious metal element(s).

Preferably the thickness of the multiple internal electrode layers is 0.5 μm or less each.

Although the internal electrode layer becomes more prone to oxidization when its thickness is 0.5 μm or less, the present invention can prevent diffusion of oxygen into the laminate as mentioned above and therefore the thickness of the internal electrode layer can be reduced to 0.5 μm or less.

As described above, according to the present invention, a multilayer capacitor that can be made smaller while achieving larger capacitance by means of thinner covers, without causing a drop in capacitance or reliability, can be provided.

Any discussion of problems and solutions involved in the related art has been included in this disclosure solely for the purposes of providing a context for the present invention, and should not be taken as an admission that any or all of the discussion were known at the time the invention was made.

As described above, according to the present invention, a multilayer capacitor that can be made smaller while achieving larger capacitance by means of thinner covers, without causing a drop in capacitance or reliability, can be provided.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIG. 1 is a perspective view of a multilayer capacitor pertaining to an embodiment of the present invention.

FIG. 2 is a section view of the same multilayer capacitor.

FIG. 3 shows a schematic view showing the laminate of the same multilayer capacitor.

FIG. 4 shows a schematic view showing the manufacturing method of the same multilayer capacitor.

FIG. 5 shows a schematic view showing the manufacturing method of the same multilayer capacitor.

FIG. 6 shows a schematic view of a multilayer capacitor pertaining to an example of variation of the present invention.

FIG. 7 is a graph showing the relationship of Pt content and extent of oxidation in the electrode material paste in an example of the present invention.

FIG. 8 is a table showing the high-temperature load test results of the multilayer capacitors pertaining to the examples and comparative examples of the present invention.

FIG. 9 is a schematic SEM image of a section of the multilayer capacitor pertaining to the comparative example of the present invention.

FIG. 10 is a schematic SEM image of a section of the multilayer capacitor pertaining to the example of the present invention.

DESCRIPTION OF THE SYMBOLS

100—Multilayer capacitor
101—Laminate
102—First internal electrode layer
103—Second internal electrode layer
104—First terminal
105—Second terminal
1011—Dielectric layer
1012—Cover

DETAILED DESCRIPTION OF EMBODIMENTS

A multilayer capacitor pertaining to an embodiment of the present invention is explained.

Constitution of Multilayer Capacitor

FIG. 1 is a perspective view of a multilayer capacitor 100 pertaining to an embodiment described here, while FIG. 2 is a section view of the multilayer capacitor 100. In each view, the three directions intersecting one another are defined as the X direction, Y direction and Z direction. FIG. 2 is a section view in the X-Z plane.

As shown in these views, the multilayer capacitor 100 has a laminate 101, first internal electrode layers 102, second internal electrode layers 103, a first terminal 104, and a second terminal 105.

FIG. 3 is a schematic view showing the structure of the laminate 101. As shown in the figure, the laminate 101 is constituted by a stack of multiple dielectric layers 1011, and covers 1012 stacked onto the dielectric layers 1011. Both the dielectric layers 1011 and covers 1012 are made of dielectric material.

As shown in FIG. 2, one principal face of the laminate 101 is given as a first principal face 101a, and the principal face on the opposite side is given as a second principal face 101b. In addition, one side face of the laminate 101 is given as a first side face 101c, and the side face on the opposite side is given as a second side face 101d. It should be noted that the laminate 101 may have a rectangular solid shape as shown in FIG. 1, or any other shape.

The dielectric layers 1011 function as dielectrics of the multilayer capacitor 100. Each dielectric layer 1011 is a flat sheet and, as shown in FIG. 3, multiple of them are stacked in such a way that they are sandwiched by the alternating first internal electrode layers 102 and second internal electrode layers 103 and in parallel with the first principal face 101a and second principal face 101b. The number of dielectric layers 1011 is not specifically limited and there may be several layers to several hundred layers. The covers 1012 will be mentioned later.

The dielectric material constituting the dielectric layers 1011 and covers 1012 may be barium titanate ($BaTiO_2$), calcium titanate ($CaTiO_3$), strontium titanate ($SrTiO_3$), calcium zirconate ($CaZrO_3$), or other dielectric ceramic material. The dielectric layers 1011 and covers 1012 may be a sintered stack of multiple sheets (green sheets) made of such dielectric ceramic material, which will be described in detail later.

The first internal electrode layers 102 are made of conductive material and function as one electrode of the multilayer capacitor 100. As shown in FIG. 2, multiple first internal electrode layers 102 are provided inside the laminate 101. The first internal electrode layers 102 are each a flat sheet and stacked in such a way that they are apart from each other and in parallel with the first principal face 101a and second principal face 101b, with the dielectric layers 1011 placed in between. It should be noted that the number of first internal electrode layers 102 is not specifically limited and there may be several layers to several hundred layers. The thickness of the first internal electrode layers 102 may be 0.05 μm or more but 0.5 μm or less each.

One ends of the first internal electrode layers 102 are exposed to the first side face 101c, contacting the first terminal 104, and are electrically connected to the first terminal 104. The other ends of the first internal electrode layers 102 are away from the second side face 101d.

The first internal electrode layers 102 may have Ni as a primary component and contain at least one type of metal selected from Pt, Ru, Rh, Re, Ir, Os, and Pd (hereinafter referred to as "precious metal elements").

To be specific, the first internal electrode layers 102 may be made by applying an electrode material paste containing such materials onto green sheets and then sintering the green sheets. The electrode material paste may be a mixture of conductive powder whose primary component is Ni, organic metal complex containing a precious metal element(s) by 0 to 5 percent by mol relative to Ni, binder, organic solvent, and dispersant. For the binder, ethyl cellulose resin, polyvinyl butyral resin, acrylic resin, etc., may be used. For the organic solvent, one whose primary component is terpineol or other terpene solvent may be used. Under this method of internal electrode (internal electrode layer) formation, the thickness of the obtained internal electrodes is 0.3 μm or more each. Here, the internal electrode thickness is set to 0.5 μm.

It should be noted that the sputtering method permits forming thin internal electrodes of 0.05 μm to 0.3 μm. Sputter film is formed on the green sheets by applying high voltage to the target containing Ni and a specified quantity of precious metal(s).

When the electrode material paste applied on the green sheets is sintered, its organic components are removed and first internal electrode layers 102 whose primary component is Ni and which contains a precious metal element(s) are formed. A favorable content of precious metal element(s) in the first internal electrode layers 102 is 1 percent by mol or more relative to Ni each.

The second internal electrode layers 103 are made of conductive material and function as the other electrode of the multilayer capacitor 100. As shown in FIG. 2, multiple second internal electrode layers 103 are provided inside the laminate 101. The second internal electrode layers 103 are each a flat sheet and stacked in such a way that they are apart from each other and in parallel with the first principal face 101a and second principal face 101b, with the dielectric layers 1011 placed in between. It should be noted that the number of second internal electrode layers 103 is not specifically limited and there may be several layers to several hundred layers. The thickness of the second internal electrode layers 103 may be 0.05 μm or more but 0.5 μm or less each.

One ends of the second internal electrode layers 103 are exposed to the second side face 101d, contacting the second terminal 105, and are electrically connected to the second terminal 105. The other ends of the second internal electrode layers 103 are away from the first side face 101c.

The second internal electrode layers 103, as with the first internal electrode layers 102, may have Ni as a primary component and contain at least one type of metal selected from Pt, Ru, Rh, Re, Ir, Os, and Pd.

To be specific, the second internal electrode layers 103 may be made by applying an electrode material paste containing such materials onto green sheets and then sintering the green sheets. The electrode material paste may be a mixture of conductive powder whose primary component is Ni, organic metal complex containing a precious metal element(s) by 0 to 5 percent by mol relative to Ni, binder, organic solvent, and dispersant. For the binder, ethyl cellulose resin, polyvinyl butyral resin, acrylic resin, etc., may be used. For the organic solvent, one whose primary component is terpineol or other terpene solvent may be used. It should be noted that the sputtering method permits forming thin internal electrodes of 0.05 μm to 0.3 μm. Sputter film is formed on the green sheets by applying high voltage to the target containing Ni and specified quantity of precious metal(s).

When the electrode material paste applied on the green sheets is sintered, its organic components are removed and second internal electrode layers 103 whose primary component is Ni and which contains a precious metal element(s) are formed. A favorable content of precious metal element(s) in the second internal electrode layers 103 is 1 percent by mol or more relative to Ni each.

The first internal electrode layers 102 and second internal electrode layers 103 are stacked together alternately with the dielectric layers 1011 placed in between, as shown in FIG. 3. This way, the first internal electrode layers 102 and second internal electrode layers 103 alternate from the opposing sides, with the dielectric layers 1011 placed in between, to constitute a capacitor.

The first terminal 104 functions as one terminal of the multilayer capacitor 100. As shown in FIG. 2, the first terminal 104 is provided on the first side face 101c, contacting the first internal electrode layers 102 exposed on the first side face 101c, and is electrically connected to the first internal electrode layers 102. Additionally, the first terminal 104 may also be partially provided on the first principal face 101a and second principal face 101b, as shown in FIG. 2.

The first terminal 104 is made of conductive material and may be made by sintering a conductive paste that contains Ni, Cu or other metal, for example.

The second terminal 105 functions as the other terminal of the multilayer capacitor 100. As shown in FIG. 2, the second terminal 105 is provided on the second side face 101d, contacting the second internal electrode layers 103 exposed on the second side face 101d, and is electrically connected to the second internal electrode layers 103. Additionally, the second terminal 105 may also be partially provided on the first principal face 101a and second principal face 101b, as shown in FIG. 2.

The second terminal 105 is made of conductive material and may be made by sintering a conductive paste that contains Ni, Cu, or other metal, for example.

Covers

The covers 1012 cover the first internal electrode layers 102 and second internal electrode layers 103 and shield them from the outside. In the laminate 101, the covers 1012 correspond, among the first internal electrode layers 102 and second internal electrode layers 103, to the space between the internal electrode layer closest to the first principal face 101a and the first principal face 101a, as well as the space between the internal electrode layer closest to the second principal face 101b and the second principal face 101b, as shown in FIG. 3.

A favorable thickness of the covers 1012 is 30 μm or less each. So long as this thickness is 30 μm or less, or in other words the distance between the internal electrode layer closest to the first principal face 101a and the first principal face 101a and distance between the internal electrode layer closest to the second principal face 101b and the second principal face 101b are both 30 μm or less, the electrostatic capacitance of the multilayer capacitor 100 per unit volume can be increased. It should be noted that the distances between the internal electrode layers closest to the respective principal faces and the respective principal faces are specified by the shortest distance between the first principal face 101a and the second internal electrode layer 103 closest to the first principal face 101a and also by the shortest distance between the second principal face 101b and the first internal electrode layer 102 closest to the second principal face 101b, as viewed in the section in FIG. 2.

Manufacturing Method of Multilayer Capacitor

The manufacturing method of the multilayer capacitor 100 is explained. FIG. 4 is a schematic view showing the manufacturing method of the multilayer capacitor 100.

As shown in the figure, sheet materials S1 each comprising a green sheet G coated with an electrode material paste P are stacked together. As mentioned above, the green sheets G are made of dielectric ceramic material, while the electrode material paste P is a paste being a mixture of conductive powder whose primary component is Ni, organic metal complex containing a precious metal element(s), binder, and organic solvent, etc. The electrode material paste P is applied to the green sheets G to extend to one side of the respective green sheets, and then the sheets are stacked together so that their coated sides alternate. To form the internal electrode layers by sputtering, metal masks are placed in contact with the green sheets and then high voltage is applied to a target comprising electrode material to cause sputter grains to deposit. After the metal masks are removed, the sheets are stacked together in the same manner as under the printing method. A sheet material S2 comprising a stack of multiple layers of green sheets G not coated with the electrode material paste P, is stacked as the topmost layer, and also as the bottommost layer, of the sheet materials S1.

FIG. 4 shows a constitution corresponding to one multilayer capacitor 100; in reality, however, many multilayer capacitors 100 can be produced at the same time. In other words, green sheets G on which the electrode material paste P is applied in multiple locations can be stacked together according to the arrangement shown in FIG. 4.

Next, the laminate comprising a stack of sheet materials S2 that will become the covers 1012, and the sheet materials S1, is compression-bonded. This compression bonding may be done using the thermal compression bonding method, hydrostatic press method, or the like. Furthermore, the compression-bonded laminate is cut into individual pieces. FIG. 5 is a perspective view showing an individually cut laminate A.

Next, the first terminal 104 and second terminal 105 are formed on a side face A1 and side face A2 of the laminate A (refer to FIG. 1), respectively. The first terminal 104 and second terminal 105 may be formed by applying a conductive paste that contains Ni or Cu, for example.

Next, the laminate A is sintered. This sintering may be performed in a reducing ambience, for example. Because of the sintering, the green sheets G constituting the sheet materials S1 become the dielectric layers 1011, while the green sheets G constituting the sheet materials S2 become the covers 1012. Also, the electrode material paste P becomes the first internal electrode layers 102 and second internal electrode layers 103. This way, the multilayer capacitor 100 is produced. The multilayer capacitor 100 may be manufactured using any other method.

Effects of Multilayer Capacitor

If the covers 1012 are not very thick (especially when the thickness is around 30 μm or less), oxygen permeates through the covers 1012 and diffuses into the laminate 101 in the sintering process, as mentioned above. As a result, the oxygen that has diffused into the laminate 101 may reach the first internal electrode layers 102 and second internal electrode layers 103.

Because of this, a problem arises that, when the first internal electrode layers 102 and second internal electrode layers 103 contain Ni but no precious metal element, they may be oxidized by the oxygen that has diffused into the laminate 101 and Ni oxides may be produced as a result to cause insulation failure and cracking and consequent drop in reliability. On the other hand, the first internal electrode layers 102 and second internal electrode layers 103 in this embodiment are made of an electrode material containing a precious metal element(s) and thus are not oxidized by the oxygen that has diffused into the laminate 101, and consequently the aforementioned reliability problem does not occur (refer to the example).

Furthermore, a good modulus of continuity (90 percent or more) can be achieved because oxidization is prevented, and the capacitor can have larger capacitance as a result. The modulus of continuity refers to the ratio of the total sum of the lengths of continuous parts, to the total sum of the lengths of continuous parts and disrupted parts of the internal electrode layer. As described above, in this embodiment the multilayer capacitor 100 can be made thinner while achieving larger capacitance at the same time, by means of thinner covers 1012.

Example of Variation

Not all of the first internal electrode layers 102 and second internal electrode layers 103 need to contain Ni and precious metal element(s). FIG. 6 is a schematic view showing a partial constitution of a multilayer capacitor 100 pertaining to an example of variation. As shown in the figure, only some (one in the figure) of the first internal electrode layers 102 on the side of the second principal face 101b are defined as first internal electrode layers 102a and the remaining first internal electrode layers 102 are defined as first internal electrode layers 102b. Or, some layers on the side of the first principal face 101a may be defined as first internal electrode layers 102a. The number of first internal electrode layers 102a may be one or greater from the side of the second principal face 101b, and zero or one or greater from the side of the first principal face 101a, for example.

The first internal electrode layers 102a may contain Ni and precious metal element(s) as mentioned above, while the first internal electrode layers 102b may contain Ni but no precious metal element.

The same goes with the second internal electrode layers 103 in that only some layers on the side of the first principal face 101a may be defined as second internal electrode layers 103a that contain Ni and precious metal element(s), while the remaining second internal electrode layers 103 may be defined as second internal electrode layers 103b that contain Ni but no precious metal element. Or, some layers on the side of the second principal face 101b may be defined as second internal electrode layers 103a. The number of second internal electrode layers 103a may be one or greater from the side of the first principal face 101a, and zero or one or greater from the side of the second principal face 101b, for example.

The first internal electrode layers 102b and second internal electrode layers 103b may be made by, for example, applying to green sheets an electrode material paste being a mixture of organic metal complex containing conductive powder whose primary component is Ni, binder, organic solvent, and dispersant, and then sintering the green sheets as described above.

Despite having such constitution, the first internal electrode layers 102a and second internal electrode layers 103a containing a precious metal element(s) are not oxidized by the oxygen that has permeated through the covers 1012. The first internal electrode layers 102b and second internal electrode layers 103b are away from the covers 1012 and therefore the oxygen that has permeated through the covers 1012 does not reach them and their oxidization is prevented as a result. This allows the multilayer capacitor 100 to be made thinner while maintaining reliability. In addition, the fact that the first internal electrode layers 102b and second internal electrode layers 103b do not contain any expensive precious metal element allows for lowering of the manufacturing cost of the multilayer capacitor 100.

Examples

An electrode material paste for use as the material for the first internal electrode layers and second internal electrode layers shown in the above embodiment was produced and the relationship of content of precious metal element(s) and oxidization degree was evaluated.

An electrode material paste was produced by mixing conductive powder whose primary component was Ni, organic metal complex containing Pt, binder, organic solvent, and dispersant. For the binder, ethyl cellulose resin was used. The organic solvent has terpineol as its primary component. Several types of electrode material pastes, each containing the organic metal complex by a different quantity, were produced. Each electrode material paste was dried and pulverized and the resulting powder sample was weighed after heating it in atmosphere at 1250° C. The rate of increase in weight compared to before the heat treatment was used to give the extent of oxidization.

FIG. 7 is a graph showing the relationship of Pt content and extent of oxidization. The Pt content represents the substance quantity ratio of Pt to Ni (in percent by mol). As shown in the figure, oxidization resistance tends to rise when the Pt content is 1 percent by mol or more (area inside the broken line in the figure).

Multilayer capacitors of type 1005 as described in the above embodiment were produced. For the internal electrode layers (first internal electrode layers and second internal electrode layers), an electrode material paste containing Ni and Pt was used. At this time, the content of Pt was varied from 0 to 5 percent by mol. The electrode material paste was applied to green sheets whose primary component was barium titanate, after which the green sheets were stacked together, compression-bonded, cut, provided with terminals, binder-removed, and sintered, to produce a multilayer capacitor. Additionally, a sputtering target constituted by NiPt, NiPd, NiRh, or NiPtPd was used to form the internal electrode layers based on the sputtering method.

The internal electrode layers were made 0.5 µm thick under the printing method, while the internal electrode layers were made no more than 0.1 µm thick under the sputtering method. Multiple types of multilayer capacitors were produced, having covers of different thicknesses ranging from 15 to 50 µm. The dielectric layers were made 0.5 µm thick, and 500 layers were stacked together.

For comparison, a multilayer capacitor whose internal electrode layers utilized an electrode material paste containing Ni but no Pt was also produced in the same manner. A total of 1,000 multilayer capacitor samples were produced.

A high-temperature load test (105° C.-9V) was conducted on each multilayer capacitor. Among the 1,000 chips placed, those exhibiting abnormal voltage resistance after an elapse of 1,000 hours were counted. The test results are shown in FIG. 8. As shown in the figure, the number of failed multilayer capacitor samples increased as the covers became thinner in the case of the multilayer capacitors whose internal electrode layers contained Ni but no Pt ("Ni" in the figure). On the other hand, none of the multilayer capacitor samples failed regardless of the thickness of the covers in the case of the multilayer capacitors whose internal electrode layers contained Ni as well as Pt by at least 1 percent ("Ni—Pt 1%" in the figure). The same effect was also confirmed when the internal electrode layers contained Pd, Rh, or other Pt group element, and also when they contained both Pt and Pd.

Additionally, to check whether the internal electrode layers were oxidized or not, each multilayer capacitor was embedded in resin and polished to expose a section of the laminate capacitor at the center, and this section of each multilayer capacitor was observed with a SEM (scanning electron microscope) at magnifications of 15000 times. Presence or absence of oxidization was determined based on whether or not two or more of the internal electrode layers near the covers had been oxidized. FIG. 9 is a schematic SEM image of a section of a multilayer capacitor whose internal electrode layers contained Ni but no Pt, while FIG. 10 is a schematic SEM image of a section of a multilayer capacitor whose internal electrode layers contained both Ni and Pt.

In FIG. 9 and FIG. 10, the internal electrode layers E, dielectric layers Y and cover C are shown. As shown in FIG. 9, the internal electrode layers containing Ni but no Pt had been oxidized (white areas in the figure). On the other hand, the internal electrode layers containing both Ni and Pt had not been oxidized, as shown in FIG. 10.

As described above, it is found that a multilayer capacitor whose internal electrode layers contain both Ni and Pt would prevent oxidization of its internal electrode layers. In addition, oxidization of internal electrode layers containing a precious metal element(s) other than Pt (Ru, Rh, Re, Ir, Os, and/or Pd) could also be prevented, just like oxidization of those containing Pt is prevented.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2015-17007, filed Jan. 30, 2015, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A multilayer capacitor having:
   a laminate comprising a stack of multiple dielectric layers made of dielectric material and having a first principal face and a second principal face on an opposite side of the first principal face; and multiple internal electrode layers whose primary component is Ni and which are arranged in parallel with the first principal face and second principal face inside the laminate in such a way that they alternate from opposing sides with the dielectric layers placed in between; wherein, of the internal electrode layers, at least the internal electrode layer closest to the first principal face and internal electrode layer closest to the second principal face contain in its entirety at least one metal element selected from the group consisting of Pt, Ru, Rh, Re, Ir, Os, and Pd;

of the multiple internal electrode layers, the internal electrode layer closest to the first principal face has a distance of 30 μm or less from the first principal face; and of the multiple internal electrode layers, the internal electrode layer closest to the second principal face has a distance of 30 μm or less from the second principal face, wherein internal electrode layers away from the first and second principal faces, among the multiple internal electrode layers, contain none of any metal element selected from the group consisting of Pt, Ru, Rh, Re, Ir, Os, and Pd.

2. A multilayer capacitor according to claim 1, wherein a thickness of the multiple internal electrode layers is 0.5 μm or less each.

* * * * *